INVENTOR.
Bertram Wolfe

Sept. 3, 1968  B. WOLFE  3,400,049
STEAM COOLED NUCLEAR REACTOR POWER SYSTEM
Filed Jan. 11, 1967  3 Sheets-Sheet 2

INVENTOR.
Bertram Wolfe

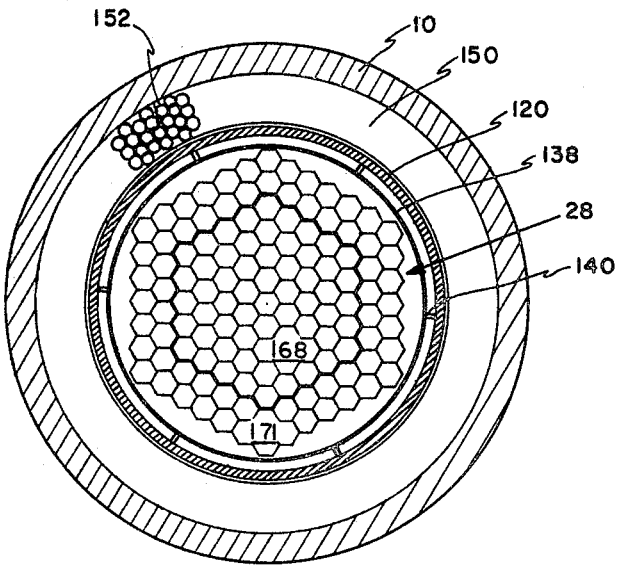
Fig. 3
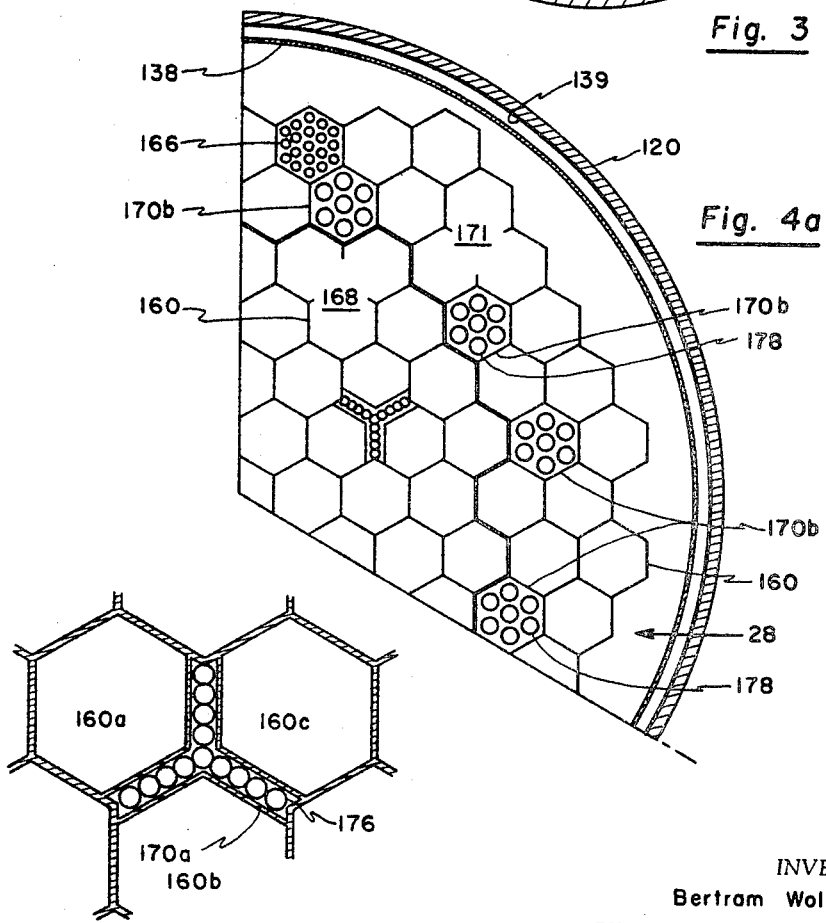
Fig. 4a
Fig. 4b
INVENTOR.
Bertram Wolfe

United States Patent Office 3,400,049
Patented Sept. 3, 1968

3,400,049
STEAM COOLED NUCLEAR REACTOR
POWER SYSTEM
Bertram Wolfe, San Jose, Calif., assignor to General
Electric Company, a corporation of New York
Filed Jan. 11, 1967, Ser. No. 608,548
12 Claims. (Cl. 176—60)

ABSTRACT OF THE DISCLOSURE

This invention relates to the conversion of mass to thermal energy in a chain nuclear fission reactor. In particular, it relates to a steam cooled nuclear reactor utilized as a heat source in an improved superheated steam power plant system in which highly superheated possibly contaminated steam from the reactor is cooled by indirect heat exchange with purified saturated steam to produce purified superheated steam and moderated by superheated contaminated steam which is purified by direct contact with water to produce the purified saturated steam.

---

The release of large amounts of energy through nuclear fission in chain nuclear fission reactors is now well known. Useful mechanical or electrical energy can be generated by conversion of the heat energy liberated in such nuclear fission reactions. This energy generation involves a chain reacting assembly containing nuclear fuel, a coolant passed through heat exchange relationship with the assembly, and control of the coolant flow and the assembly operating conditions to produce, either directly or indirectly, a heated coolant. This coolant is fed to a suitable prime mover, i.e., a device for converting thermal energy to either mechanical or electrical energy or both, to generate mechanical or electrical energy. Reasonably high thermodynamic energy conversion efficiencies are favored by the delivery of the heated coolant from the chain reacting assembly to the prime mover inlet at as high a temperature as possible. In the usual industrial application, using a heat sink temperature of about 100° F. for example, the lowest feasible coolant inlet temperatures at the prime mover inlet are in most cases in the range of 200° to 300° F., but the conversion efficiencies are quite low. With coolant temperatures on the order of 1500° F., high thermodynamic efficiencies are readily obtained. The use of still higher inlet temperatures to achieve further increases in efficiency is limited primarily by reason of the increased heat losses from the system and the mechanical or chemical properties of the structural materials used in the system.

The high temperature coolant so generated can be used in various kinds of prime movers. They include steam and gas driven reciprocating or rotating machinery such as gas or steam engines, gas or steam turbines, and the like, either with or without mechanically driven electric power generation equipment connected to the prime mover as a load to convert the mechanical energy to electrical energy. Steam has been the principal working fluid in such prime movers, and since thermodynamic efficiencies increase with an increase in the inlet temperature of the working fluid, steam superheating has long been practiced in power plant systems deriving their heat from fossil fuel combustion. In addition to increased efficiency, superheating provides a reduction of condensation within the prime mover and consequently a decrease in erosion problems. Prime mover construction is also considerably simplified, and in addition a smaller heat sink (turbine-condenser) is required.

The superheating of steam in a nuclear reactor presents distinct problems from those involved in the superheating of steam by fossil fuel combustion. The major problem involves the possible migration of radioactive materials which either leak from defective fuel or are released by erosion or corrosion from structural surfaces in the reactor core in contact with the steam coolant. Such materials are carried into and are deposited in the steam turbine (or other heat sink) and its associated piping. Such an occurrence requires additional shielding and presents extremely difficult and expensive equipment decontamination problems. One way of avoiding this problem is to resort to an indirect cycle system in which one fluid is used as reactor coolant with a second coolant being used as the turbine working fluid, the two fluids being brought into indirect heat exchange with one another.

It is an object of this invention to provide an improved power plant system using a steam cooled reactor as the heat source and in which radioactive contamination of the heat sink is avoided without the disadvantages of using two coolant fluids in an indirect cycle.

The present invention will be readily understood by reference to the accompanying drawings and their associated detailed description in which:

FIGURE 3 is a horizontal cross-section of the equipment illustrated in FIGURE 2; and FIGURES 4a and 4b show details of portions of the reactor core.

Figure 1:
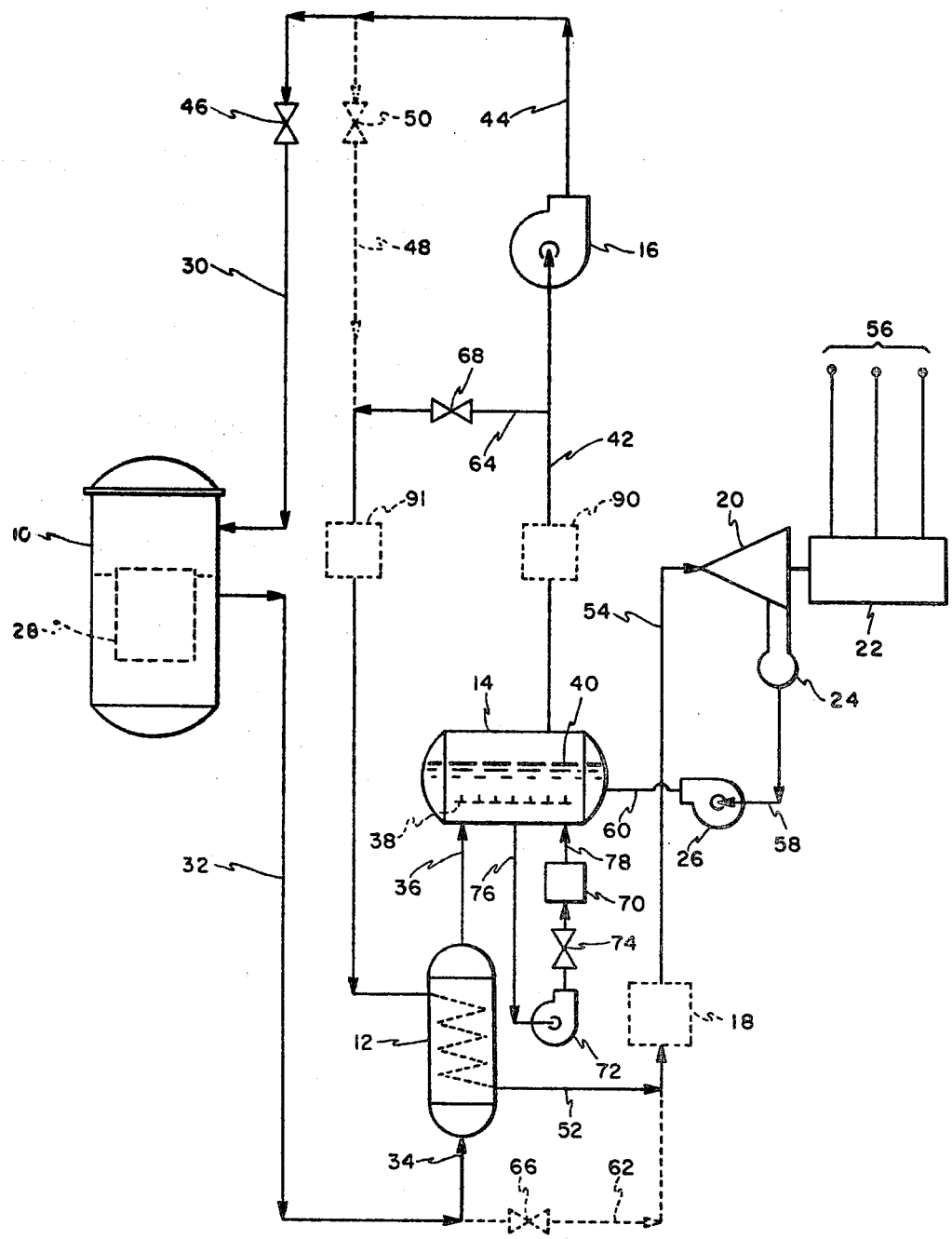
FIGURE 1 is a simplified schematic flow diagram of the power plant system of this invention.

Referring now to FIGURE 1, the essential parts of the power plant system of this invention include reactor vessel 10, heat exchanger 12, a direct contact steam generator 14 (such as a Loeffler type boiler or desuperheater), steam recirculator 16, turbine 20, generator 22, condenser 24, and condensate-feedwater pump 26, and asseociated valves and piping.

Reactor vessel 10 contains a chain nuclear fission reactor core 28, described in further detail below by way of example in connection with FIGURES 2 and 3, and through which steam is circulated as the coolant. Saturated steam is introduced by means of line 30 and after passing through heat exchange relation with the fuel elements of reactor core 28 is discharged through line 32 in highly superheated condition. Typical steam temperatures for system operation at 1500 p.s.i. are 600° F. at inlet line 30 and 950° F. at outlet line 32. This steam is possibly contaminated with radioactive materials referred to above.

Superheated steam is passed by means of lines 32 and 34 through the shell side of heat exchanger 12, where the steam is cooled somewhat, and on through line 36 into Loeffler boiler type steam generator 14. The steam generator is provided with sparger 38 submerged below the surface of a body of water 40. Superheated steam from line 36 is distributed by sparger 38 into direct contact with the water, desuperheating the steam and evaporating an amount of water ranging from 25–35% of the amount of superheated steam introduced to sparger 38. Although for illustration a Loeffler type boiler is shown, steam generator 14 may comprise other types of direct contact steam generator such as a desuperheater.

Saturated steam is withdrawn from boiler 14 through line 42 through an optional steam purifier 90, and is divided into two portions. The major portion, approximately 75% of the total, is pumped by means of circulator 16 through lines 44 and 30 and valve 46 as inlet steam coolant to reactor vessel 10. The remaining minor portion, approximately 25%, is passed through line 64 and valve 68, on optional steam purifier 91, and on through the tube side of heat exchanger 12 in countercurrent heat exchange relation with the highly superheated steam effluent from the reactor. Here the minor portion of saturated steam from steam generator 14 is superheated substantially, closely approaching a temperature equal to that of the reactor coolant outlet. This is largely due to the fact that the flow ratio of reactor effluent steam to the minor saturated steam portion in the exchanger is approximately 4.

Superheated steam produced in the tube side of exchanger 12 flows through lines 52 and 54, including an optional steam purifier 18, and into turbine 20 driving generator 22 provided with output terminals 56. Exhaust steam condenses in condenser 24 and the condensate is circulated by means of condensate-feedwater pump 26 and lines 58 and 60 into steam generator 14.

In the system described above, both bypass lines 62 and 48, provided respectively with valves 66 and 50, are closed. The entire quantity of superheated steam driving turbine 20 is produced in steam generator 14 and is superheated in exchanger 12; it does not flow directly from reactor vessel 10 to the turbine. Any radioactive contaminants released in reactor core 28 are carried through exchanger 12 into steam generator 14 in which, because the steam is discharged into direct contact with the water in steam generator 14, are substantially completely retained in the water. The saturated steam produced is found to have a radioactivity level which is only on the order of $1 \times 10^{-4}$ that which may exist in the reactor effluent. Additional removal of contamination can be accomplished, if necessary, by other decontamination methods in the optional steam purification systems 18, 90, and 91. Thus, the superheated steam driving turbine 20 is free of radioactive contaminants and yet has a temperature very close to that of the reactor effluent. The removal of these contaminants from the body of water in steam generator 14 is readily accomplished by application of the well-known filtration and ion exchange technology currently employed in treatment of the moderator-coolant in water cooled nuclear reactor systems of the pressurized water and boiling water types. In FIGURE 1 such a water purification facility 70 is illustrated operating with recirculating pump 72, control valve 74, and connecting lines 76 and 78.

In one modification of this invention, the power plant system illustrated in FIGURE 1 may be operated with valve 68 closed and valve 50 in bypass line 48 open, valve 66 in bypass line 62 also being closed. This results in a modest increase in the pressure of decontaminated superheated steam introduced from exchanger 12 through lines 52 and 54 into turbine 20, but it increases by approximately 25–35% the horsepower requirement to drive steam circulator 16. This is due to the fact that in this modification the steam flow through circulator 16 includes the flow of steam directed as reactor core 28 coolant passing through lines 44 and 30, and valve 46, as well as the steam supplied through exchanger 12 to the turbine 20. In this modified operation, as in the operation described previously, any radioactive contaminant carryover from reactor core 28 is substantially completely accumulated in the body of water 40 in steam generator 14, and if necessary in the optional steam purification systems 18, 90, and 91, or any of them, and is thus prevented from reaching turbine 20.

In a second modification of this invention, a modification which is particularly applicable during operation with new fuel loaded in reactor core 28, or with substantially all of any defective fuel previously used in the core having been removed and replaced with sound reload fuel, the system of FIGURE 1 may be operated with valve 50 in bypass line 48 and valve 68 in line 64 both closed, and valve 66 in bypass line 62 open. In such operation, no superheated steam is produced in exchanger 12 and highly superheated steam passes directly from reactor vessel 10 through lines 32, 62, and 54 to turbine 20. Such operation of the system is the same as that of the previously known Loeffler boiler. The system of this invention may be operated in that manner so long as the reactor core 28 is free of defective fuel and free of erosion and corrosion problems extensive enough to cause an unacceptable radioactive contamination of the steam, with the attendant advantages of maximum steam temperature at the turbine 20 inlet and maximum thermodynamic efficiencies. As soon as unacceptable levels of radioactive contamination are detected in steam outlet line 32, valve 66 in bypass line 62 may be partially or completely closed (depending on the degree of contamination) and valve 68 in line 64 may be opened (correspondingly) partially or completely to produce uncontaminated superheated steam in exchanger 12 and thus reduce the degree of contamination in the steam mixture delivered to the turbine.

In a third modification of this invention, the procedure just described may be changed to open valve 50 in bypass line 48 rather than valve 68 in line 64. This results in increases in the turbine inlet pressure and circulator power requirements referred to in the description of the first modification.

Following in tabular form is a specific example of the operation of the system of this invention as applied in the manner described in connection with FIGURE 1.

EXAMPLE I

Reactor core 28

| | | |
|---|---|---|
| Power level | mwt | 139.0 |
| Coolant flow ($\times 10^{-6}$) | lb./hr | 1.735 |
| Inlet temperature | °F | 608.5 |
| Outlet temperature | °F | 950 |
| Inlet presure | p.s.i.a | 1500 |
| Outlet pressure | p.s.i.a | 1400 |

Heat exchanger 12

| | | |
|---|---|---|
| Heat load ($\times 10^{-6}$) | B.t.u./hr | 139.0 |
| Tube side: | | |
|   Mean ΔT | °F | 120.5 |
|   Flow ($\times 10^{-6}$) | lb./hr | 1.735 |
|   Inlet temperature | °F | 950 |
|   Outlet temperature | °F | 817 |
|   Inlet pressure | p.s.i.a | 1370 |
|   Outlet pressure | p.s.i.a | 1340 |
| Shell side: | | |
|   Mean ΔT | °F | 120.5 |
|   Flow ($\times 10^{-6}$) | lb./hr | 0.536 |
|   Inlet temperature | °F | 580 |
|   Outlet temperature | °F | 900 |
|   Inlet pressure | p.s.i.a | 1315 |
|   Outlet pressure | p.s.i.a | 1200 |

Steam generator 14

| | | |
|---|---|---|
| Heat load ($\times 10^{-6}$) | B.t.u./hr | 366.0 |
| Superheated steam: | | |
|   Flow rate ($\times 10^{-6}$) | lb./hr | 1.735 |
|   Inlet temperature | °F | 950 |
|   Inlet pressure | p.s.i.a | 1340 |
| Feedwater: | | |
|   Flow rate ($\times 10^{-6}$) | lb./hr | 0.536 |
|   Inlet temperature | °F | 520 |
| Demineralizer (70) water: Flow rate ($\times 10^{-3}$) | lb./hr | 26.6 |
| Saturated steam: | | |
|   Flow rate ($\times 10^{-6}$) | lb./hr | 2.271 |
|   Quality | percent | 99 |

Circulator 16

| | | |
|---|---|---|
| Flow rate ($\times 10^{-6}$) | lb./hr | 1.735 |
| Head | p.s.i.a | 210 |
| Inlet: | | |
|   Pressure | p.s.i.a | 1300 |
|   Temperature | °F | 580 |
| Outlet: | | |
|   Pressure | p.s.i.a | 1510 |
|   Temperature | °F | 608 |

Turbine 20

| | |
|---|---|
| Flow rate ($\times 10^{-6}$) _____lb./hr__ | 0.536 |
| Inlet temperature _____° F__ | 900 |
| Inlet pressure _____p.s.i.a__ | 1170 |

Generator 22

| | |
|---|---|
| Output, gross _____mwe__ | 56 |

Condenser 24

| | |
|---|---|
| Heat load ($\times 10^{-6}$) _____B.t.u./hr__ | 273 |
| Cooling water flow ($\times 10^{-6}$) _____lb./hr__ | 0.3 |

Figure 2:
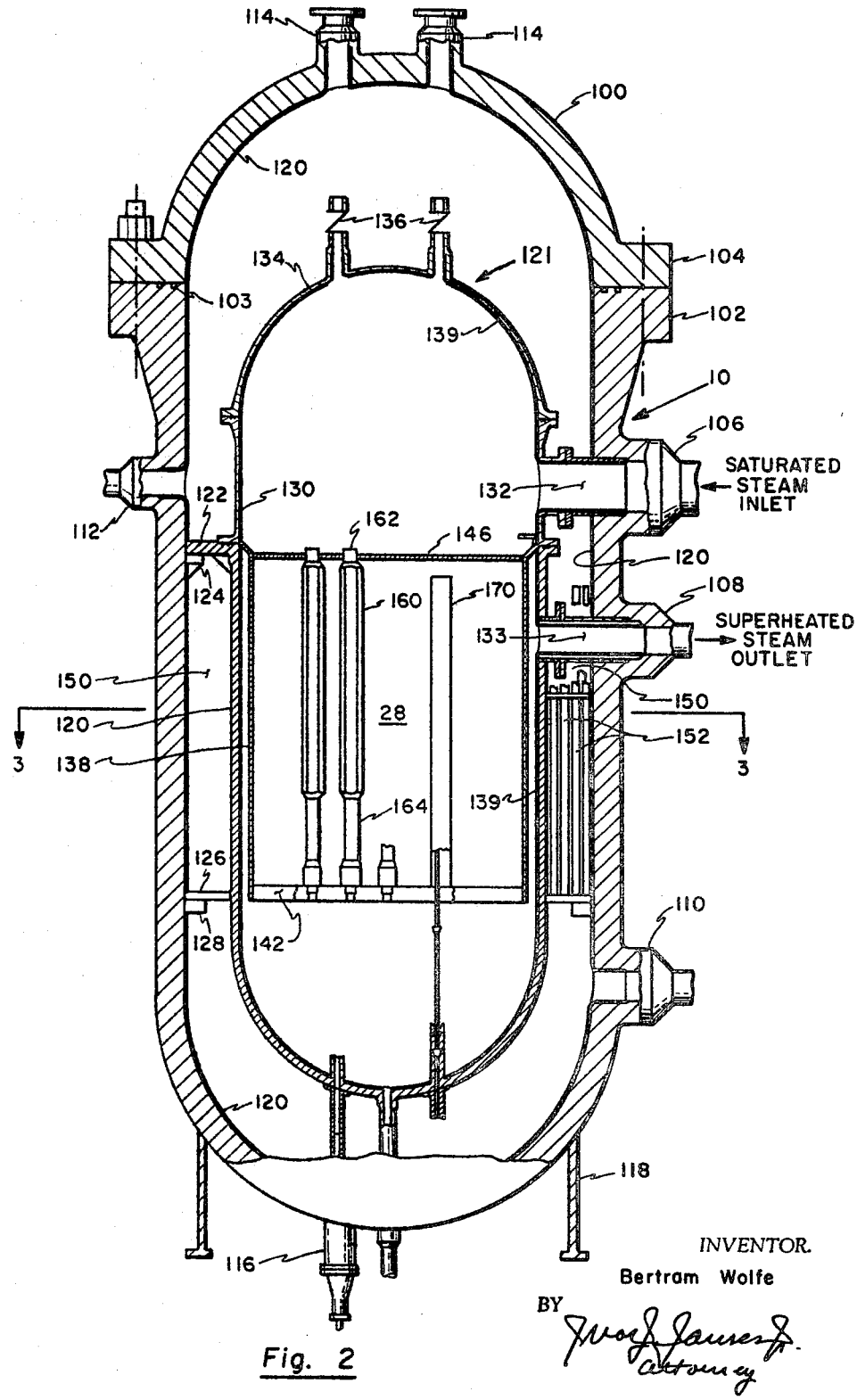
FIGURE 2 is a vertical cross-section view of a steam cooled nuclear reactor and its associated equipment including pressure vessel.

Referring now to FIGURE 2, a vertical cross-section view of reactor pressure vessel 10 and its contents is shown. Pressure vessel 10 is provided with removable head 100 secured by means of flanges 102 and 104 and flange seal 103, three saturated steam inlets 106 spaced 120° apart from each other, twelve superheated steam outlets 108 spaced 30° apart from one another, shield water inlet 110, shield water outlet 112, pressure relief valve connections 114, a plurality of control element drive connection nozzles 116, vessel support skirt 118, and a stainless steel layer 120 is welded or otherwise bonded onto the entire interior surface of the carbon steel pressure vessel 10.

Within and spaced apart from the interior surface of pressure vessel 10 is inner pressure vessel 121 supported by means of flange 122 and support brackets 124 secured to the pressure vessel wall. The inner pressure vessel is provided with lateral support guide 126 cooperating with brackets 128, and intermediate removable (flanged) spool portion 130 provided with three inlet steam connections 132 communicating with the three steam inlets 106, twelve outlet steam connections 133 communicating with the twelve steam outlets 108, an upper removable (flanged) head portion 134 provided with relief valves 136, a cylindrical core shroud 138 secured within and spaced apart from inner vessel 121 by means of radial ribs 140 (shown more clearly in FIGURE 3), and lower core support plate 142 secured at the bottom of shroud 138. The entire inner surface of inner pressure vessel 120 and its steam inlet and outlet connections 132 and 133 is provided with a layer 139 of thermal insulation of the laminated stainless steel type.

In the annular region 150 laterally surrounding reactor core 28 between adjacent surfaces of inner pressure vessel 121 and reactor pressure vessel 10 and extending approximately between levels opposite lower core support plate 142 and upper core support means 146, are located a plurality of stainless steel shield rods 152. These rods are arranged on a triangular pitch to prevent "line of sight" radiation from core 28 reaching outer pressure vessel 10. These tubes are surrounded by a body of shield water which fills the entire region between the inner and outer pressure vessels and is introduced at inlet 110 and removed at outlet 112. The shield water flow rate is controlled to prevent boiling; the shield water effectively shields the outer pressure vessel from leakage neutron and gamma radiation emitted by core 28. In annular region 150, fast leakage neutrons are in part reflected back toward core 28. Heat released in the shield rods is dissipated in the shield water flow.

The following description of the structural nature of reactor core 28 contains references to FIGURES 3, 4a and 4b. In FIGURE 3 outer pressure vessel 10, annular region 150, inner pressure vessel 120, core shroud 138, core 28, and shield rods 152 referred to in the description of FIGURE 1 are shown. In FIGURES 4a and 4b an enlarged view of a sector of the core 28 is shown surrounded by shroud 138.

The reactor core 28, indicated generally in FIGURE 1 and in greater detail in FIGURES 2–4, includes a plurality of fuel-containing flow channels 160 supported from support plate 142 and secured at their upper ends against lateral movement by upper core support means 146. The reactor contains substantially no moderator and operates with a fast neutron energy spectrum.

The reactor core 28 consists of a central fuel-containing region 168 and a surrounding radial blanket or reflector region 171 as illustrated in FIGURE 3, both regions made up of hexagonal flow channels. Each flow channel is tubular, having an intermediate portion 160 (except as described below in connection with the control elements of the central region 168 of the core) of hexagonal cross-section substantially throughout its length and provided with cylindrical end portion 162 and 164 at the upper and lower ends, respectively. Each flow channel is provided in its intermediate portion with a hexagonal bundle of elements or rods shown in FIGURES 4a and 4b spaced apart from one another by conventional fuel rod support and spacing means not shown. Each fuel rod consists of a metal clad tube sealed at both ends and containing at successively lower levels an upper gas plenum or void region, an upper axial blanket or reflector region, a main fuel region, and a lower axial blanket or reflector region. The rods provided in the flow channels of the radial blanket or reflector region contain throughout their lengths a fast neutron reflector material. The composition of the materials contained in these various regions and the dimensions of the fuel and reflector rods and flow channels are given in Example II.

A plurality of control element guide tubes 170 also supported from plate 142, are distributed among flow channels 160. These guide tubes provide open regions axially through the core 28 within which control elements may be reciprocated.

In the central core region 168 the control element guide tubes 170a (best shown in FIGURES 4a and 4b) are tubular having a Y-shaped or triflute cross-section with equally sized branches spaced 120° apart from the longitudinal axis of the tube. To provide space to accommodate guide tubes 170a, the three adjacent flow channels (160a, 160b, and 160c) are of a partial hexagonal shape as illustrated. In this core region the control elements consist of an elongated element made up of three rows of parallel boron carbide filled tubes 176, the rows being radially spaced 120° apart from one another around the longitudinal axis of the control element and arranged to be reciprocated in correspondingly shaped guide tube 170a.

In the radial blanket region 171 of the core, control element guide tubes 170b are hexagonal, of substantially the same cross-section as that of flow channels 160. In this region the control elements comprises a bundle of boron carbide filled tubes 178 arranged on a triangular pitch to fit within guide tube 170b.

As a typical example of the dimensions and compositions of the equipment illustrated in FIGURES 2–4 the following data are given, representative of a fast neutron spectrum steam cooled reactor suitable as a heat source for application in the power plant system described in FIGURE 1 and Example I.

EXAMPLE II

*Pressure vessel 10*

| | Inches |
|---|---|
| Inside height | 276 |
| Inside diameter | 96 |
| Outside diameter | 108 |
| Wall thickness, over-all | 6 |
| Clad thickness | 0.25 |

*Inner pressure vessel 120*

| | |
|---|---|
| Inside height | 205 |
| Inside diameter | 70 |
| Outside diameter | 73 |
| Wall thickness | 1.50 |

*Shroud 138*

| | |
|---|---|
| Inside diameter | 64 |
| Thickness | 0.5 |

Lower support plate 142

| | |
|---|---|
| Thickness | 4 |

Reactor core 28

CENTRAL FUELED REGION 168

| | |
|---|---|
| No. of flow channels: | |
|   Full—160 | 40 |
|   Partial—160a, b, c | 18 |
| No. of control guide tubes 170a | 6 |

RADIAL REFLECTOR REGION 17.

| | |
|---|---|
| No. of flow channels 160 | 54 |
| No. of control guide tubes 170b | 12 |

CORE 28 DIMENSIONS

| | Inches |
|---|---|
| Height, over-all | 54 |
| Diameter, over-all (incl. reflectors) | 57 |
| Diameter central region (equivalent circular) | 39.5 |
| Heights: | |
|   Upper gas plenum | 8 |
|   Upper axial blanket | 18 |
|   Main fuel region | 18 |
|   Lower axial blanket | 18 |

FUEL BUNDLES

| | |
|---|---|
| Cross-section | Hexagonal. |
| Dimension (across flats) | 4.81 inches. |
| Channel thickness | 0.114 inch. |
| Material | 304 S.S. |
| No. of fuel rods/bundle: | |
|   Full bundles | 228 |
|   Partial bundles | 190 |

FUEL RODS

| | |
|---|---|
| Outside diameter | 0.228 inch. |
| Clad material | Incoloy 800. |
| Clad thickness | 0.015 inch. |
| Spacing, center/center | 0.274 inch. |

Fuel compositions (fresh, atom percent)

CENTRAL REGION 168

Upper/lower axial brankets:
  $UO_2$—

| | Percent |
|---|---|
| 235 | 0.3 |
| 238 | 99.7 |

MAIN FUEL REGION $UO_2$—

| | |
|---|---|
| 235 | 0.225 |
| 238 | 74.775 |

$PuO_2$—

| | |
|---|---|
| 239 | 16.20 |
| 240 | 5.75 |
| 241 | 2.75 |
| 242 | 0.3 |

Radial reflector bundles region 171

| | |
|---|---|
| Cross-section | Hexagonal. |
| Distance across flats | 4.81 inches. |
| Channel thickness | 0.114 inch. |
| No. of rods/bundle | 19. |
| Rod diameter | 1.0 inch. |
| Material | Nickel. |
| Center/center spacing | 1.02 inches. |

Control elements

CENTRAL REGION 168

| | |
|---|---|
| Cross-section | Triflute. |
| No. of tubes each element 170a | 15. |
| Outside diameter | 0.41 inch. |
| Clad thickness | 0.020 inch. |
| Clad material | 304 S.S. |
| Length, over-all | 20 inches. |
| Control material | Tantalum. |

RADIAL REFLECTOR REGION 171

| | |
|---|---|
| Cross-section | Hexagonal. |
| Distance across flats | 4.81 inches. |
| Channel thickness | 0.114 inch. |
| No. of rods each element 170b | 37. |
| Outside diameter | 0.68 inch. |
| Clad thickness | 0.020 inch. |
| Clad material | 304 S.S. |
| Length, over-all | 20 inches. |
| Control material | $B_4C$. |

Displacement shield rods 152

| | |
|---|---|
| Outside diameter | 2 inches. |
| Material | Solid 304 S.S. |

The optional steam purifiers (18, 90, and 91) referred to in the description of FIGURE 1 may comprise a mechanical filter, a centrifugal separator, an electrostatic precipitator, or any other purification system applicable to particular contaminants present.

Although the foregoing examples have dealth with a power reactor system having an electrical rating of about 50 MW and a fast neutron spectrum steam cooled reactor having a thermal power rating of about 140 MW, the invention is, of course, not so limited, and that higher as well as lower energy ratings are contemplated. Further, although Example II illustrated an application of this invention in which a fast neutron spectrum nuclear reactor was used as the heat source, the invention is not so limited to that preferred embodiment, and thermal as well as intermediate energy spectrum reactors may be substituted. In general, it should be understood that various other modifications and adaptations may be made by those skilled in this particular art without departing from the spirit and scope of this invention as defined in the following claims.

I claim:

1. In a nuclear reactor power apparatus which comprises a nuclear chain fission reactor heat source, a direct contact steam generator, a steam-driven prime mover connected to a load and to an exhaust steam condenser, means for introducing condensate from said condenser as feedwater to said steam generator, first means for passing saturated steam from said steam generator as coolant into said heat source, and means for passing superheated steam produced by absorption of thermal energy released in said heat source to said prime mover, the improvement which comprises an indirect heat exchanger, means for passing superheated steam from said heat source through said exchanger and into said steam generator, and second means for passing saturated steam from said steam generator through said heat exchanger, said means for passing superheated steam into said prime mover being connected in steam receiving relation to said exchanger.

2. A nuclear reactor power apparatus according to claim 1 wherein said second means is connected directly to receive saturated steam from said steam generator.

3. A nuclear reactor power apparatus according to claim 1 wherein said second means is connected directly to receive saturated steam from said first means.

4. A nuclear reactor power apparatus according to claim 1 in combination with means for removing water from said steam generator, means for treating said water to remove contaminants carried with superheated steam introduced from said heat source, and means for returning decontaminated water to said steam generator.

5. A nuclear reactor power apparatus according to claim 4 wherein said means for treating said water comprises an ion exchange resin.

6. A nuclear reactor power apparatus according to claim 1 in combination with superheated steam purification means connected in steam delivery relation to said prime mover.

7. A nuclear reactor power apparatus according to claim 1 in combination with saturated steam purification means connected in steam receiving relation to said steam generator.

8. A nuclear reactor power apparatus according to claim 1 in combination with valve means connected in said second means to control the flow of saturated steam from said boiler to said heat exchanger, and means including a valve for passing superheated steam directly from said heat source to said prime mover.

9. A process for production of useful thermal energy from a chain nuclear fission reaction which comprises establishing a nuclear chain fission reaction to release thermal energy, absorbing said thermal energy in a steam coolant to produce superheated steam, passing said superheated steam through an indirect heat exchange zone, thereafter decontaminating said superheated steam by removal of radioactive materials contained in said steam, utilizing part of the decontaminated steam as said steam coolant, passing the remainder of said decontaminated steam through said indirect heat exchange zone to produce superheated steam substantially free of radioactive contamination, and utilizing the contaminant-free superheated steam to produce said useful energy.

10. In the process for production of useful energy from a nuclear chain fission reaction which comprises establishing a nuclear chain fission reaction to release thermal energy, absorbing said thermal energy in a coolant introduced as saturated steam to produce superheated steam, utilizing a first part of said superheated steam to produce said useful energy and steam condensate, utilizing a second part of said superheated steam to evaporate water and produce saturated steam, and utilizing said saturated steam as said saturated steam coolant, the improvement which comprises continuing said process until the radioactive contaminant level in said first part of said superheated steam reaches a predetermined level, thereafter reducing the flow of said first part thereby increasing the flow of said second part of said superheated steam, continuing to utilize a first part of said saturated steam as said saturated steam coolant, passing a second part of said saturated steam in indirect heat exchange relation with said second part of said superheated steam to produce substantially radioactive contaminant-free superheated steam, and mixing the contaminant-free superheated steam thus produced with said first part of said superheated steam to reduce the contaminant level of said mixture.

11. In a process according to claim 10 in combination with the step of treating the boiling water mixture resulting from combining said water with said second part of said superheated steam to remove contaminants accumulating in said mixing during operation.

12. In a process according to claim 10 wherein the flow of said first part of said superheated steam is successively reduced during operation and the flow of saturated steam passed in indirect heat exchange with said second part of said superheated steam is successively increased to maintain the radioactive contaminant content of the superheated steam mixture at an acceptable level.

References Cited

UNITED STATES PATENTS 3,117,422   1/1964   Bauer et al.

REUBEN EPSTEIN, *Primary Examiner.*